(12) United States Patent
Kim et al.

(10) Patent No.: US 12,293,533 B2
(45) Date of Patent: May 6, 2025

(54) DEPTH MAP IMAGE GENERATION METHOD AND COMPUTING DEVICE THEREFOR

(71) Applicant: 3I INC., Daegu (KR)

(72) Inventors: Ken Kim, Seoul (KR); Ji Wuck Jung, Goyang-si (KR); Farkhod Rustam Ugli Khudayberganov, Seoul (KR); Mikhail Li, Paju-si (KR)

(73) Assignee: 3I INC., Daegu (KR)

( * ) Notice: Subject to any disclaimer, the term of this patent is extended or adjusted under 35 U.S.C. 154(b) by 397 days.

(21) Appl. No.: 17/878,206

(22) Filed: Aug. 1, 2022

(65) Prior Publication Data

US 2022/0414909 A1 Dec. 29, 2022

Related U.S. Application Data

(63) Continuation of application No. PCT/KR2021/012652, filed on Sep. 16, 2021.

(30) Foreign Application Priority Data

Jun. 23, 2021 (KR) .......................... 10-2021-0081608
Jun. 23, 2021 (KR) .......................... 10-2021-0081814

(51) Int. Cl.
*G06K 9/00* (2022.01)
*G06T 7/55* (2017.01)

(52) U.S. Cl.
CPC ...... *G06T 7/55* (2017.01); *G06T 2207/10024* (2013.01); *G06T 2207/20084* (2013.01)

(58) Field of Classification Search
CPC ..................... G06N 3/08; G06N 20/00; G06T 2207/10028; G06T 17/00
See application file for complete search history.

(56) References Cited

U.S. PATENT DOCUMENTS 9,324,190 B2 4/2016 Bell et al.
10,482,679 B2 11/2019 Bell et al.
(Continued)

FOREIGN PATENT DOCUMENTS

CN 112771539 A 5/2021
JP 2015-1760 A 1/2015
(Continued)

OTHER PUBLICATIONS

Yang, J., et al. "Implement Free-Viewpoint Image through Spherical Mapping of 360 Degree Panorama Image." Proc. KICS Winter Conf. 2015., (1 page in English, 3 pages in Korean).
(Continued)

*Primary Examiner* — Hadi Akhavannik
(74) *Attorney, Agent, or Firm* — NSIP Law

(57) ABSTRACT

A computing device is provided. The computing device includes a memory configured to store one or more instructions; and a processor configured to execute the one or more instructions stored in the memory, in which the processor may execute the one or more instructions to generate a first predicted depth map image for a learning red/green/blue (RGB) image using a neural network, and train the neural network based on a difference between a learning depth map image having depth information and the first predicted depth map image. The learning depth map image may match 1:1 and may be generated based on the same setting change for a basic spherical image.

14 Claims, 19 Drawing Sheets

(56) References Cited

U.S. PATENT DOCUMENTS

| | | | |
|---|---|---|---|
| 10,529,141 B2 | 1/2020 | Bell et al. | |
| 10,529,142 B2 | 1/2020 | Bell et al. | |
| 10,529,143 B2 | 1/2020 | Bell et al. | |
| 10,848,731 B2 | 11/2020 | Simek et al. | |
| 10,909,770 B2 | 2/2021 | Bell et al. | |
| 11,094,137 B2 | 8/2021 | Gausebeck et al. | |
| 11,164,394 B2 | 11/2021 | Gausebeck | |
| 11,417,096 B2 | 8/2022 | Fleisher | |
| 2014/0043436 A1 | 2/2014 | Bell et al. | |
| 2014/0125658 A1 | 5/2014 | Bell et al. | |
| 2014/0125767 A1 | 5/2014 | Bell et al. | |
| 2014/0125768 A1 | 5/2014 | Bell et al. | |
| 2014/0125769 A1 | 5/2014 | Bell et al. | |
| 2014/0125770 A1 | 5/2014 | Bell et al. | |
| 2018/0139431 A1 | 5/2018 | Simek et al. | |
| 2019/0004534 A1* | 1/2019 | Huang | G06V 10/454 |
| 2019/0026956 A1 | 1/2019 | Gausebeck et al. | |
| 2019/0026957 A1 | 1/2019 | Gausebeck | |
| 2019/0026958 A1* | 1/2019 | Gausebeck | G06T 7/579 |
| 2019/0035165 A1* | 1/2019 | Gausebeck | G06T 7/521 |
| 2019/0394441 A1 | 12/2019 | Simek et al. | |
| 2020/0160546 A1* | 5/2020 | Gu | G06T 3/18 |
| 2021/0049372 A1 | 2/2021 | Lee et al. | |
| 2021/0166495 A1 | 6/2021 | Bell et al. | |

FOREIGN PATENT DOCUMENTS

| | | | |
|---|---|---|---|
| JP | 2016-35742 A | 3/2016 | |
| KR | 10-2021-0019221 A | 2/2021 | |
| KR | 10-2234461 B1 | 4/2021 | |
| WO | WO 2018/140656 A1 | 8/2018 | |
| WO | WO 2020/069049 A1 | 4/2020 | |

OTHER PUBLICATIONS

Zioulis, Nikolaos, et al. "Spherical View Synthesis for Self-Supervised 360° Depth Estimation." *2019 International Conference on 3D Vision (3DV)*. IEEE, arXiv:1909.08112v1 [cs.CV] Sep. 17, 2019, (10 pages).

Jiang, Hualie, et al. "UniFuse: Unidirectional Fusion for 360° Panorama Depth Estimation." IEEE Robotics and Automation Letters 6.2, arXiv:2102.03550v2 [cs.CV] May 27, 2021, (9 pages).

Pintore, Giovanni, et al. "SliceNet: deep dense depth estimation from a single indoor panorama using a slice-based representation" Proceedings of the IEEE/CVF Conference on Computer Vision and Pattern Recognition. 2021, (3 pages).

International Search Report issued on Mar. 15, 2022 in counterpart Patent Application No. PCT/KR2021/012652 (4 pages in Korean).

Pintore, Giovanni, et al. "SliceNet: deep dense depth estimation from a single indoor panorama using a slice-based representation." *Proceedings of the IEEE/CVF Conference on Computer Vision and Pattern Recognition*. 2021. pp 11530-11540.

Zioulis, Nikolaos, et al. "Spherical view synthesis for self-supervised 360 depth estimation." *2019 International Conference on 3D Vision (3DV)*. IEEE, 2019. pp 689-699.

Yang, J., et al. "Implement free-viewpoint image through spherical mapping of 360 degree panorama image." *Proceedings of Symposium of the Korean Institute of Communications and Information Sciences. KICS Winter Conf.* 2015. vol. 1. pp. 1161-1164.

Jiang, Hualie et al., "UniFuse: Unidirectional Fusion for 360 Degree Panorama Depth Estimation," arXiv:2102.03550v2 [cs.CV] May 27, 2021, (9 Pages in English).

* cited by examiner

The Unit Sphere $S^2$ can be defined as the set of points $x \in \mathbb{R}^3$ with norm 1. It is a two-dimensional manifold, which can be parameterized by spherical coordinates $\alpha \in [0, 2\pi]$ and $\beta \in [0, \pi]$.

Spherical Signals We model spherical images and filters as continuous functions $f : S^2 \to \mathbb{R}^K$, where $K$ is the number of channels.

Rotations The set of rotations in three dimensions is called SO(3), the "special orthogonal group". Rotations can be represented by $3 \times 3$ matrices that preserve distance (i.e. $\|Rx\| = \|x\|$) and orientation ($\det(R) = +1$). If we represent points on the sphere as 3D unit vectors $x$, we can perform a rotation using the matrix-vector product $Rx$. The rotation group SO(3) is a three-dimensional manifold, and can be parameterized by ZYZ-Euler angles $\alpha \in [0, 2\pi]$, $\beta \in [0, \pi]$, and $\gamma \in [0, 2\pi]$.

Rotation of Spherical Signals In order to define the spherical correlation, we need to know not only how to rotate points $x \in S^2$ but also how to rotate filters (i.e. functions) on the sphere. To this end, we introduce the rotation operator $L_R$ that takes a function $f$ and produces a rotated function $L_R f$ by composing $f$ with the rotation $R^{-1}$:

$$[L_R f](x) = f(R^{-1}x). \tag{1}$$

Due to the inverse on $R$, we have $L_{RR'} = L_R L_{R'}$.

Inner products The inner product on the vector space of spherical signals is defined as:

$$\langle \psi, f \rangle = \int_{S^2} \sum_{k=1}^{K} \psi_k(x) f_k(x) dx. \tag{2}$$

The integration measure $dx$ denotes the standard rotation invariant integration measure on the sphere, which can be expressed as $d\alpha \sin(\beta) d\beta / 4\pi$ in spherical coordinates (see Appendix A). The invariance of the measure ensures that $\int_{S^2} f(Rx) dx = \int_{S^2} f(x) dx$, for any rotation $R \in SO(3)$. That is, the volume under a spherical heightmap does not change when rotated. Using this fact, we can show that $L_{R^{-1}}$ is adjoint to $L_R$, which implies that $L_R$ is unitary:

$$\langle L_R \psi, f \rangle = \int_{S^2} \sum_{k=1}^{K} \psi_k(R^{-1}x) f_k(x) dx$$
$$= \int_{S^2} \sum_{k=1}^{K} \psi_k(x) f_k(Rx) dx \tag{3}$$
$$= \langle \psi, L_{R^{-1}} f \rangle.$$

Spherical Correlation With these ingredients in place, we are now ready to state mathematically what was stated in words before. For spherical signals $f$ and $\psi$, we define the correlation as:

$$[\psi \star f](R) = \langle L_R \psi, f \rangle = \int_{S^2} \sum_{k=1}^{K} \psi_k(R^{-1}x) f_k(x) dx. \tag{4}$$

FIG. 16

DEPTH MAP IMAGE GENERATION METHOD AND COMPUTING DEVICE THEREFOR

CROSS-REFERENCE TO RELATED APPLICATIONS

This application is a PCT Continuation By-Pass application of PCT Application No. PCT/KR2021/012652 filed on Sep. 16, 2021, Korean Patent Application No. 10-2021-0081608 filed on Jun. 23, 2021, and Korean Patent Application No. 10-2021-0081814 filed on Jun. 23, 2021, in the Korean Intellectual Property Office, the entire disclosures of which are incorporated herein by reference for all purposes.

BACKGROUND

1. Field

The following description relates to a depth map image generation method, a method of generating learning data therefor, and a computing device therefor.

2. Description of Related Art

In recent years, virtual space realization technologies have been developed to enable users to experience as if the users are in a real space without directly visiting the real space by being provided with an online virtual space corresponding to the real space.

In order to implement such a virtual space, there is a need for a process of providing a virtual space by acquiring a flat image captured for a real space to be implemented, and generating a three-dimensional virtual image based on the flat image.

The related art provides a virtual image based on a flat image, but distance information may not be known in the conventional virtual space, and as a result, there is a limitation in that it lacks a sense of reality and three-dimensional information.

SUMMARY

This Summary is provided to introduce a selection of concepts in a simplified form that is further described below in the Detailed Description. This Summary is not intended to identify key features or essential features of the claimed subject matter, nor is it intended to be used as an aid in determining the scope of the claimed subject matter.

One aspect provides a computing device. The computing device includes: a memory configured to store one or more instructions; and a processor configured to execute the one or more instructions stored in the memory, in which the processor may execute the one or more instructions to generate a first predicted depth map image for a learning red/green/blue (RGB) image using a neural network and train the neural network based on a difference between a learning depth map image having depth information and the first predicted depth map image. The learning depth map image may match 1:1, and may be generated based on the same setting change for a basic spherical image.

Another aspect provides a computing device. The computing device is a computing device that generates a spherical virtual image using an RGB image and a depth map image, and may include a memory configured to store one or more instructions; and a processor configured to execute the one or more instructions stored in the memory, in which the processor may execute the one or more instructions to generate a predicted depth map image for a query RGB image using a neural network, and generate a spherical virtual image using the query RGB image and the predicted depth map image, the spherical virtual image including distance information on at least one point included in a virtual image, and the distance information being determined based on the predicted depth map image.

Another technical aspect provides a depth map image generation method. The depth map image generation method is a depth map image generation method performed in a computing device, and may include generating a first predicted depth map image for a learning RGB image using a neural network, and training the neural network based on a difference between a learning depth map and the first predicted depth map generated based on spherical transformation, the learning depth map matching the learning RGB image and having depth information.

Another aspect provides a storage medium. The storage medium is a storage medium in which computer-readable instructions are stored. When executed by a computing device, the instructions may cause the computing device to perform an operation of: generating an predicted depth map for a learning RGB image using a neural network; and training the neural network based on a difference between a learning depth map and the predicted depth map generated based on spherical transformation, the learning depth map matching the learning RGB image and having depth information.

Another aspect provides a computing device. The computing device includes: a memory configured to store one or more instructions; and a processor configured to execute the one or more instructions stored in the memory, in which the processor may execute the one or more instructions to: receive a basic RGB image and a basic depth map image corresponding to the basic RGB image and generate a plurality of learning RGB images and a plurality of learning depth map images after changing configuration information of the basic spherical virtual image generated by performing spherical transformation based on the basic RGB image and the basic depth map image. The plurality of learning RGB images and the plurality of learning depth map images each may match 1:1.

Another aspect provides a depth map image generation method. The depth map image generation method is a depth map image generation method performed in a computing device, and by executing one or more instructions, may include: receiving a basic RGB image and a basic depth map image corresponding to the basic RGB image; and generating a plurality of learning RGB images and a plurality of learning depth map images after changing configuration information of the basic spherical virtual image generated by performing spherical transformation based on the basic RGB image and the basic depth map image. The plurality of learning RGB images and the plurality of learning depth map images each may match 1:1.

Another aspect provides a storage medium. The storage medium is a storage medium in which computer-readable instructions are stored. When executed by a computing device, the instructions cause the computing device to: receive a basic RGB image and a basic depth map image corresponding to the basic RGB image; and generate a plurality of learning RGB images and a plurality of learning depth map images after changing configuration information of the basic spherical virtual image generated by performing spherical transformation based on the basic RGB image and the basic depth map image. The plurality of learning RGB images and the plurality of learning depth map images each may match 1:1.

Other features and aspects will be apparent from the following detailed description, the drawings, and the claims.

BRIEF DESCRIPTION OF DRAWINGS

FIG. 16 illustrates a spherical transformation, in accordance with one or more embodiments.

Throughout the drawings and the detailed description, the same reference numerals may refer to the same, or like, elements. The drawings may not be to scale, and the relative size, proportions, and depiction of elements in the drawings may be exaggerated for clarity, illustration, and convenience.

DETAILED DESCRIPTION

Figure 1:
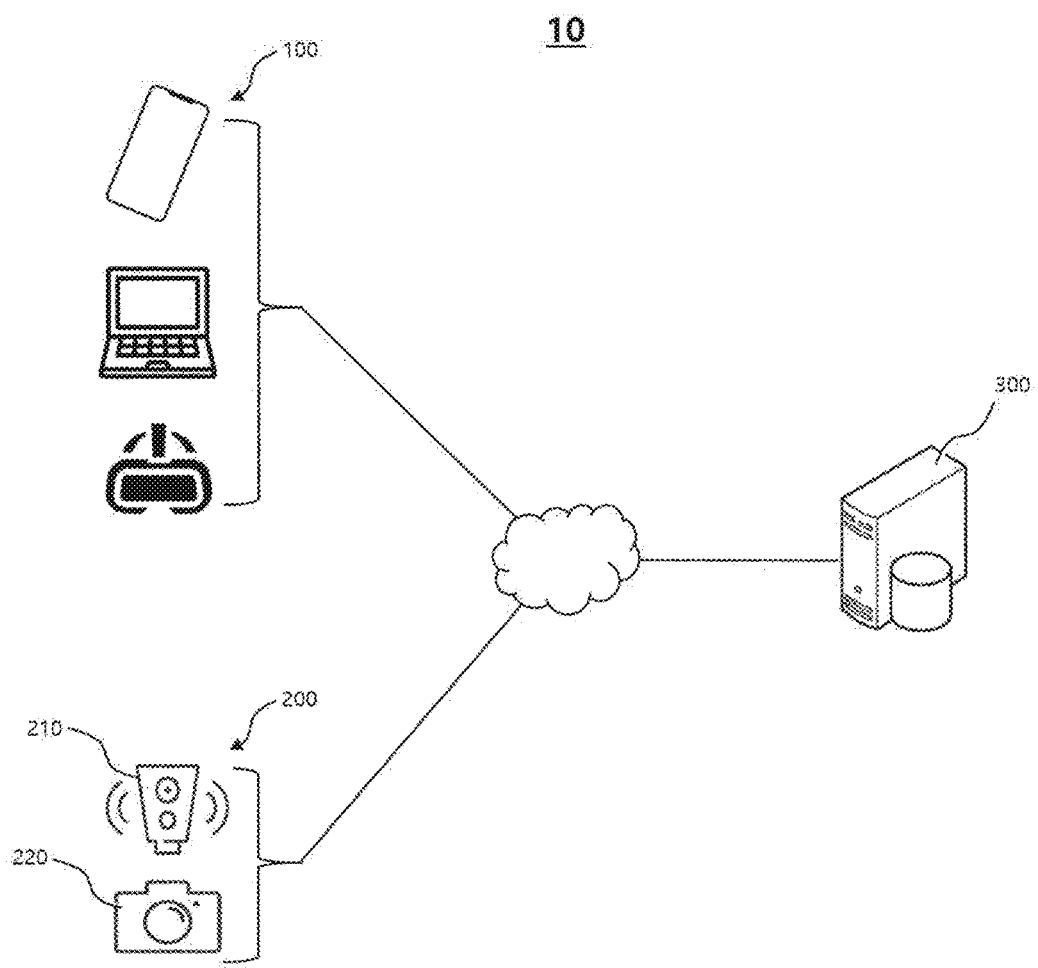
FIG. 1 illustrates a system that provides a spherical virtual image based on a depth map image, in accordance with one or more embodiments.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known, after an understanding of the disclosure of this application, may be omitted for increased clarity and conciseness, noting that omissions of features and their descriptions are also not intended to be admissions of their general knowledge.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween. Likewise, expressions, for example, "between" and "immediately between" and "adjacent to" and "immediately adjacent to" may also be construed as described in the foregoing.

The terminology used herein is for the purpose of describing particular examples only, and is not to be used to limit the disclosure. As used herein, the singular forms "a," "an," and "the" are intended to include the plural forms as well, unless the context clearly indicates otherwise. As used herein, the term "and/or" includes any one and any combination of any two or more of the associated listed items. As used herein, the terms "include," "comprise," and "have" specify the presence of stated features, numbers, operations, elements, components, and/or combinations thereof, but do not preclude the presence or addition of one or more other features, numbers, operations, elements, components, and/or combinations thereof. The use of the term "may" herein with respect to an example or embodiment (for example, as to what an example or embodiment may include or implement) means that at least one example or embodiment exists where such a feature is included or implemented, while all examples are not limited thereto.

Unless otherwise defined, all terms, including technical and scientific terms, used herein have the same meaning as commonly understood by one of ordinary skill in the art to which this disclosure pertains consistent with and after an understanding of the present disclosure. Terms, such as those defined in commonly used dictionaries, are to be interpreted as having a meaning that is consistent with their meaning in the context of the relevant art and the present disclosure, and are not to be interpreted in an idealized or overly formal sense unless expressly so defined herein.

The processors user terminal 100, computer device 300, processor 301, and other devices, and other components described herein are implemented as, and by, hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods that perform the operations described in this application, and illustrated in FIGS. 1-16, are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller, e.g., as respective operations of processor implemented methods. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that be performed by the hardware components and the methods as described above. In one example, the instructions or software include machine code that is directly executed by the one or more processors or computers, such as machine code produced by a compiler. In another example, the instructions or software include higher-level code that is executed by the one or more processors or computers using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), EEPROM, RAM, DRAM, SRAM, flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors and computers so that the one or more processors and computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

Although various flowcharts are disclosed to describe the embodiments of the present disclosure, this is for convenience of description of each step, and each step is not necessarily performed according to the order of the flowchart. That is, each step in the flowchart may be performed simultaneously, performed in an order according to the flowchart, or may be performed in an order opposite to the order in the flowchart.

In the present disclosure, as one transformation providing an all-round panoramic image, an example of a spherical transformation or a spherical virtual image will be described. That is, such a spherical transformation or a spherical virtual image is merely an example, and embodiments of the present disclosure are not limited thereto. Accordingly, it is possible to perform various transformations such as a spherical cube or a cubic virtual image by replacing a spherical transformation or a spherical virtual image.

The one or more examples are directed to providing distance information on a virtual space.

The one or more examples are directed to generating various learning data sets using one RGB image and a distance map image for the RGB image.

The one or more examples are directed to generating a depth map image from an RBG image based on learning using a neural network model.

According to an embodiment, it is possible to provide distance information on a virtual space.

According to an embodiment, it is possible to generate a plurality of learning data sets using one RGB image and a distance map image for the RGB image.

According to an embodiment, it is possible to generate a depth map image from an RBG image based on learning using a neural network model, and provide a virtual space including depth information only with an RGB image by using the generated depth map image.

According to an embodiment, it is possible to reduce a loss range to a minimum by using a plurality of functions in combination in calculating a loss used for learning a neural network.

FIG. 1 describes a system for providing a spherical virtual image based on a depth map image according to an embodiment disclosed in the present application.

A system 10 for providing a spherical virtual image based on a depth map image may include a user terminal 100, an image acquisition device 200, and a computing device 300.

The user terminal 100 is an electronic device that can be used to access a computing device 300, and may include, for example, a mobile phone, a smart phone, a laptop computer, a digital broadcasting terminal, a personal digital assistant (PDA), a portable multimedia player (PMP), navigation, a personal computer (PC), a tablet PC, an ultrabook, a wearable device (for example, a watch-type terminal (smartwatch), a glasses-type terminal (smart glasses), a head mounted display (HMD)), etc. However, in addition to this, the user terminal 100 may include electronic devices used for virtual reality (VR) and augmented reality (AR).

The image acquisition device 200 is a device for generating a color image and/or a depth map image, which is used to generate a spherical virtual image.

In the illustrated example, the image acquisition device 200 is divided into a distance measuring device 210 and an imaging device 220, but this is illustrative and distance measurement and imaging may be performed using one image acquisition device 200 (for example, a smart phone including a light wave detection and ranging (LiDAR) sensor, or the like).

The imaging device 220 is a portable electronic device having a photographing function, and generates a red/green/blue (RGB) image expressed in color for a subject area, that is, a photographing area photographed as an RGB image.

That is, in the present disclosure, the RGB image is only a representative name including all color images expressed in color, and is not limited to a specific expression method. Accordingly, not only a color image expressed in RGB but also a color image expressed in cyan magenta yellow key (CMYK) corresponds to the RGB image of the present disclosure.

Examples of the imaging device 220 may include a mobile phone, a smart phone, a laptop computer, a personal digital assistant (PDA), a tablet PC, an ultrabook, or a wearable device (for example, smart glasses) and the like.

The distance measuring device 210 is a device capable of generating a depth map image by generating depth information on a photographing area, that is, a subject area.

In the present disclosure, a depth map image includes an image including depth information on the subject area. That is, for each point of the photographed subject area, the depth map image refers to an image expressed by distance information from the imaging point to each point. For example, each pixel of the depth map image may be distance information measured from an imaging point. In such a depth map image, the distance information may be expressed in color, and FIG. 13C illustrates an example of such a depth map image.

The distance measuring device 210 may include a predetermined sensor for measuring a distance, for example, a LiDAR sensor, an infrared sensor, an ultrasonic sensor, or the like. Alternatively, the distance measurement imaging device 220 may include a stereo camera, a stereoscopic camera, a 3D depth camera, etc., that may measure distance information by replacing a sensor.

The image generated by the imaging device 220 is called a basic RGB image, and the image generated by the distance measuring device 210 is called a basic depth map image. The basic RGB image generated by the imaging device 220 and the basic depth map image generated by the distance measuring device 210 are generated under the same conditions (e.g., resolution, etc.) for the same subject area, and therefore, match 1:1.

The computing device 300 may receive the basic RGB image and the basic depth map image to perform learning. Here, the basic RGB image and the basic depth map image may be transmitted through a network.

The computing device 300 may generate a spherical virtual image based on the progressed learning. Also, the computing device 300 provides the generated spherical virtual image to the user terminal 100. Here, the spherical virtual image may be provided in various forms. For example, the spherical virtual image may be provided to be driven by the user terminal 100, or as another example, the spherical virtual image implemented by the computing device 300 may be provided through a user interface.

The spherical virtual image from the computing device 300 to the user terminal 100 may also be provided through a network.

The computing device 300 may generate a plurality of learning RGB images and learning depth map images by converting the basic RGB image and the basic depth map image. This uses a characteristic environment using the spherical virtual image, and after sphericalizing the basic RGB image and the basic depth map image, it is possible to generate the plurality of learning RGB images and learning depth map images through slight adjustments.

Hereinafter, various embodiments of components constituting the system 10 for providing a spherical virtual image will be described with reference to FIGS. 2 to 15.

Figure 2:
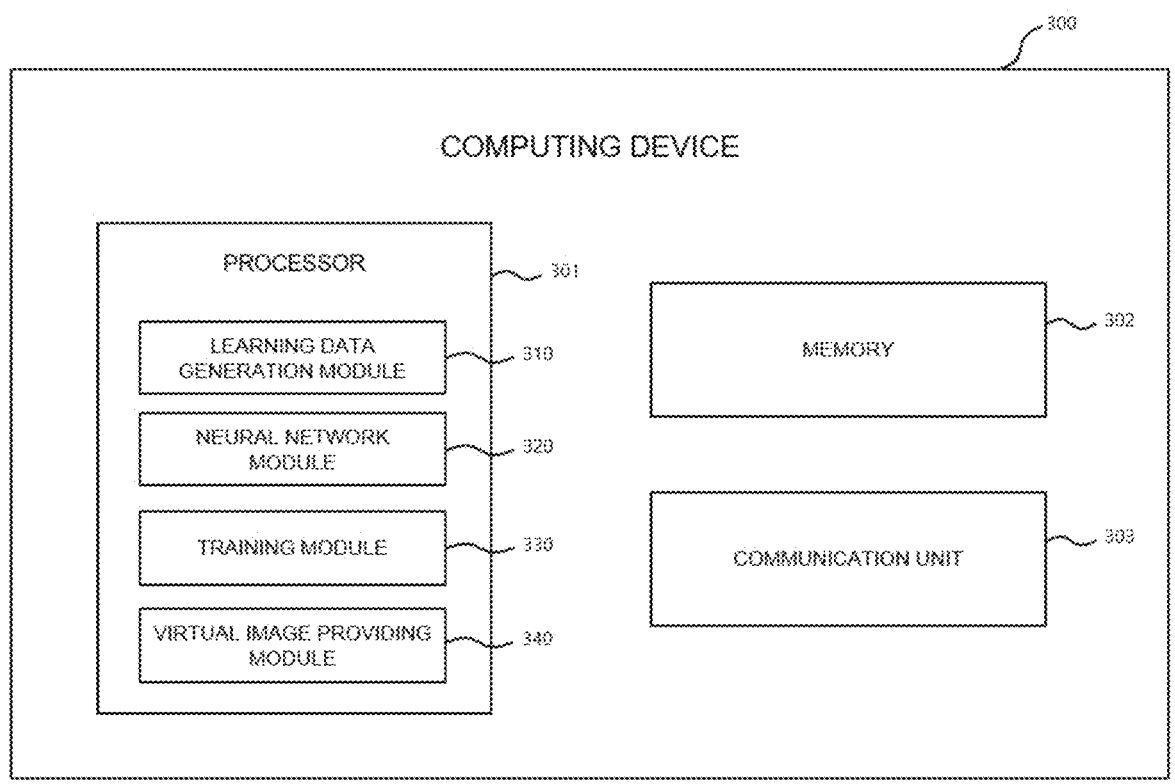
FIG. 2 is a block configuration diagram illustrating a computing device, in accordance with one or more embodiments.

FIG. 2 is a block configuration diagram illustrating a computing device according to an embodiment disclosed in the present application.

The computing device 300 may include a processor 301, a memory 302, and a communication unit 303.

The processor 301 controls the overall operation of the computing device 300. For example, the processor 301 may perform the functions of the computing device 300 described in the present disclosure by executing one or more instructions stored in the memory 302.

The processor 301 may generate the spherical virtual image based on the basic RGB image transmitted from the imaging device 220 and the basic depth map image input from the distance measuring device 210.

The processor 301 may include a learning data generation module 310 that generates various types of learning data based on the basic RGB image and the basic depth map image, a neural network module 320 that performs learning based on learning data, a training module 330 that compares a predicted depth map and a learning depth map to train the neural network module 320, and a virtual image providing module 340 that generates a spherical virtual image and provides distance information on a subject area, etc. to a user terminal.

The learning data generation module 310 may perform spherical transformation on the basic RGB image and the basic depth map image, and adjust the spherically transformed basic RGB image and basic depth map image to generate a plurality of pieces of learning data, that is, the learning RGB image and the learning depth map image.

For example, the learning data generation module 310 may perform spherical transformation on the basic RGB image transmitted from the imaging device 220 and the basic depth map image transmitted from the distance measuring device 210. The converted image may acquire various pieces of learning data while changing a rotation angle based on several axes of the spherical image. In this case, the learning RGB image refers to an RGB image provided to the neural network module 320 for learning, and the learning depth map image refers to a depth map image provided to the neural network module 320 for learning. Therefore, the learning RGB image is an image generated from the basic RGB image, and the learning depth map image is an image generated from the basic depth map image.

The neural network module 320 performs learning based on the learning RGB image for learning and the learning depth map image for the learning RGB image. For example, the learning depth map image is 1:1 related to the learning RGB image. Since the learning depth map image is generated by measuring the distance for the subject area where the learning RGB image is generated using a LiDAR sensor, etc., (including a distance estimation method using a stereo camera, or the like), the learning depth map image is a ground truth depth map. After the neural network module 320 is trained based on the learning RGB image and the learning depth map image, the neural network module 320 may generate the predicted depth map image for the input RGB image based on the learned contents.

The training module 330 may train the neural network module 320 based on the accuracy of the predicted depth map generated by the neural network module 320.

For example, the training module 330 may compare the predicted depth map generated by the neural network module 320 for the learning RGB image and the learning depth map, which is the ground truth depth map, and may continuously train the neural network module 320 so that a difference between the predicted depth map and the learning depth map is reduced.

The neural network module 320 receives a query RGB image and generates a predicted depth map. The virtual image providing module 340 may generate the spherical virtual image based on the query RGB image and the predicted depth map. The spherical virtual image may be an image provided to the user terminal 100 from the computing device 300, for example, a virtual space that may be implemented in the user terminal 100.

The memory 302 may store a program for processing and controlling the processor 301 and may store data input to the computing device 300 or output from the computing device 300. For example, the memory 302 may include at least one storage medium of a flash memory type, a hard disk type, a multimedia card micro type, a card type memory (for example, an SD or XD memory, or the like), a random access memory (RAM), a static random access memory (SRAM), a read-only memory (ROM), an electrically erasable programmable read-only memory (EEPROM), a programmable read-only memory (PROM), a magnetic memory, a magnetic disk, and an optical disk.

The communication unit 303 may include one or more modules that enable communication between the computing device 300 and other electronic devices, for example, the user terminal 100 or the image acquisition device 200, or between the computing device 300 and a network in which the other electronic devices are located.

Figure 3:
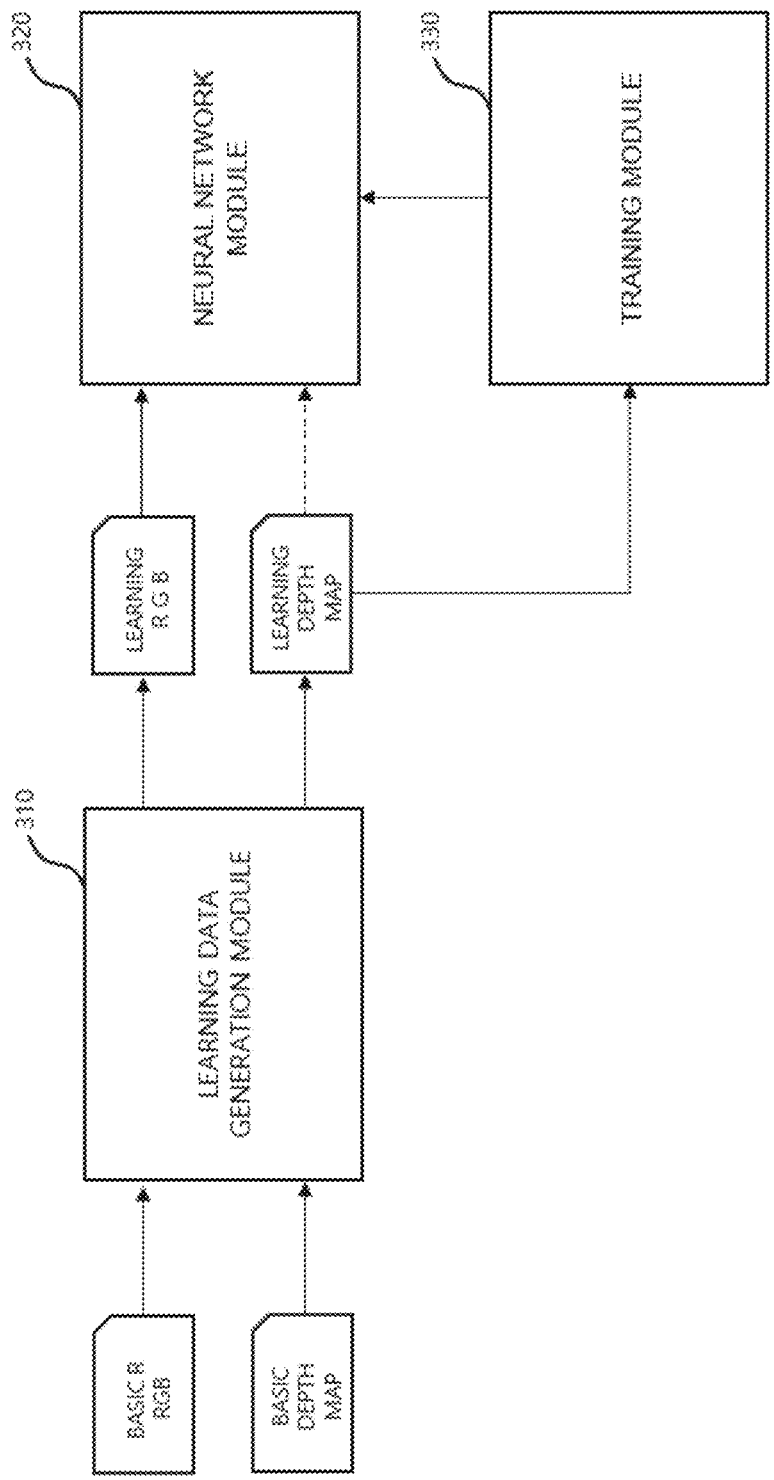
FIG. 3 illustrates a learning data generation architecture, in accordance with one or more embodiments.

FIG. 3 is a diagram for describing a learning data generation architecture according to an embodiment disclosed in the present application.

The basic RGB image illustrated in FIG. 3 is transmitted from the imaging device 220, and the basic depth map image is transmitted from the distance measuring device 210.

Here, the basic RGB image and the basic depth map image may each be an equirectangular projection image used for omnidirectional virtual reality. Various types of RGB images and depth map images to be described below may each be an equirectangular projection image used to generate an omnidirectional virtual space.

Figure 4A:
FIG. 4A and FIG. 4B illustrate an equirectangular projection image and a spherical virtual image generated using the equirectangular projection image, in accordance with one or more embodiments.
Figure 4B:
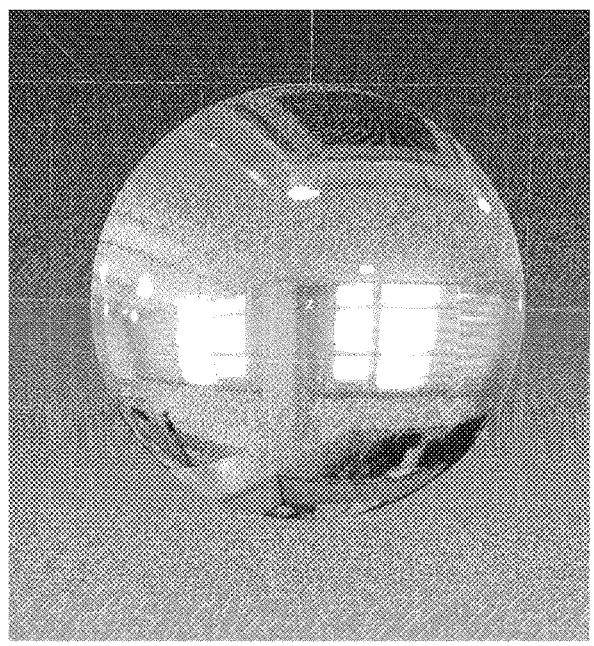

FIG. 4A and FIG. 4B illustrate the equirectangular projection image and the spherical virtual image generated using the equirectangular projection image according to an embodiment disclosed in the present application.

As in the example illustrated in FIG. 4A, the equirectangular projection image may be converted into a spherical omnidirectional virtual image (hereinafter, referred to as a "spherical virtual image") that provides a spherical viewpoint by the computing device 300.

FIG. 4B illustrates an example of converting the equirectangular projection image of FIG. 4A into the spherical virtual image. The spherical virtual image illustrated in FIG. 4B is the spherical virtual image generated based on an RGB equirectangular projection image, and relates to an example in which distance values of each pixel are set equally. Meanwhile, FIG. 4B illustrates the spherical virtual image from the outside of the spherical virtual image, but this is for convenience of description. Accordingly, the spherical virtual image may provide a virtual image in all directions of 360° left and right and 360° up and down, inside the illustrated spherical virtual image.

Hereinafter, a panoramic image (e.g., a 2:1 panoramic image, etc.) will be described as an embodiment of the equirectangular projection image. The panoramic image has the advantages of being able to derive an omnidirectional image of a space by taking one shot and being easily transformed in spherical transformation.

However, the image transmitted from the image acquisition device 200 is formed of a panoramic image, and therefore, is an example for carrying out the present application. The image transmitted from the image acquisition device 200 may be a general image(s) photographed according to the use and convenience of the image transmitted from the image acquisition device 200. In addition, the computing device 300 may convert these general images into the equirectangular projection image.

The learning data generation module 310 may receive a basic RGB image and a basic depth map image, and generate the basic spherical virtual image by spherical transformation.

The basic depth map image may be a panoramic depth map image including distance information on a subject area. The basic depth map image is matched 1:1 with the basic RGB image having the same subject area.

The learning data generation module 310 may generate the plurality of pieces of learning data, that is, the learning RGB image and learning depth map image by variously transforming the basic spherical virtual image. The learning data generation module 310 may provide the generated learning RGB image to the neural network module 320, and provide the learning depth map image to the training module 330.

That is, the learning data generation module 310 may generate the basic spherical virtual image using the basic RGB image and the basic depth map image, and change the configuration information of the basic spherical virtual image to generate the plurality of learning spherical images, and then, generate various learning data sets based on the generated learning spherical images.

One embodiment of such a learning data generation module 310 will be further described with reference to FIGS. 5 and 6.

Figure 5:
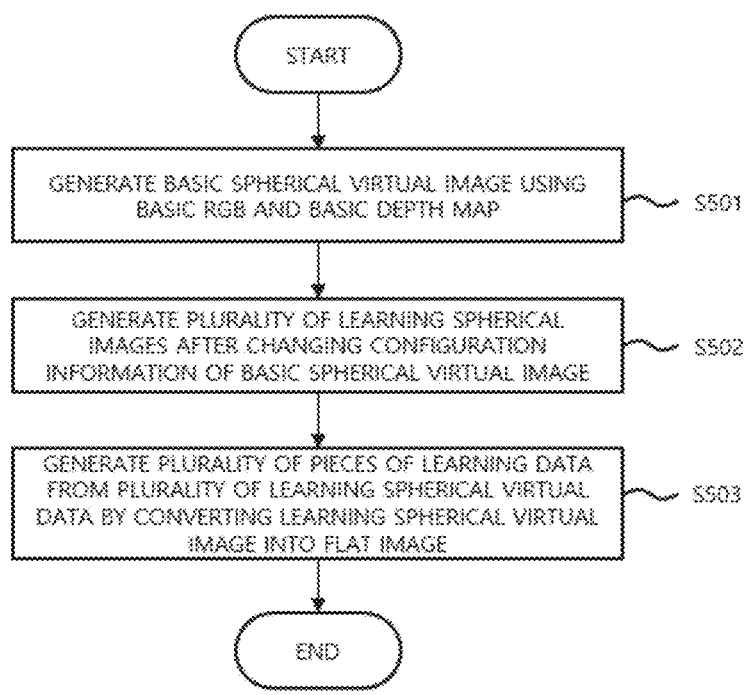
FIG. 5 illustrates a method of generating learning data, in accordance with one or more embodiments.
Figure 6A:
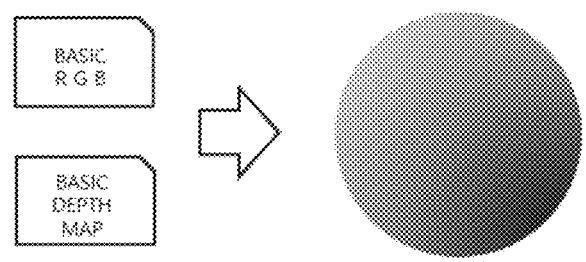
FIG. 6A, FIG. 6B, and FIG. 6C illustrate an example of generating a large amount of learning data sets based on an example of a basic red/green/blue (RGB) image and a basic depth map.
Figure 6B:
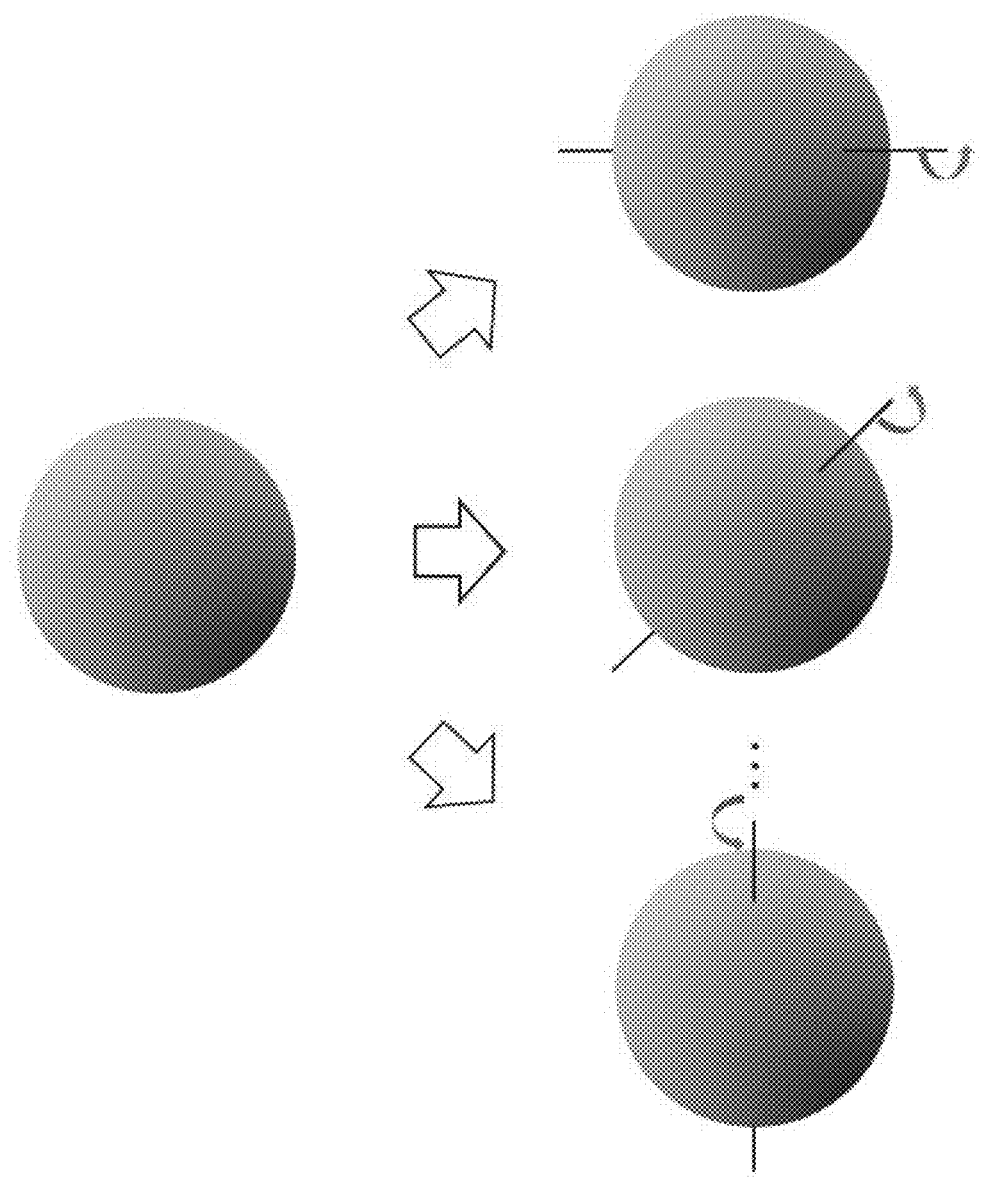
Figure 6C:
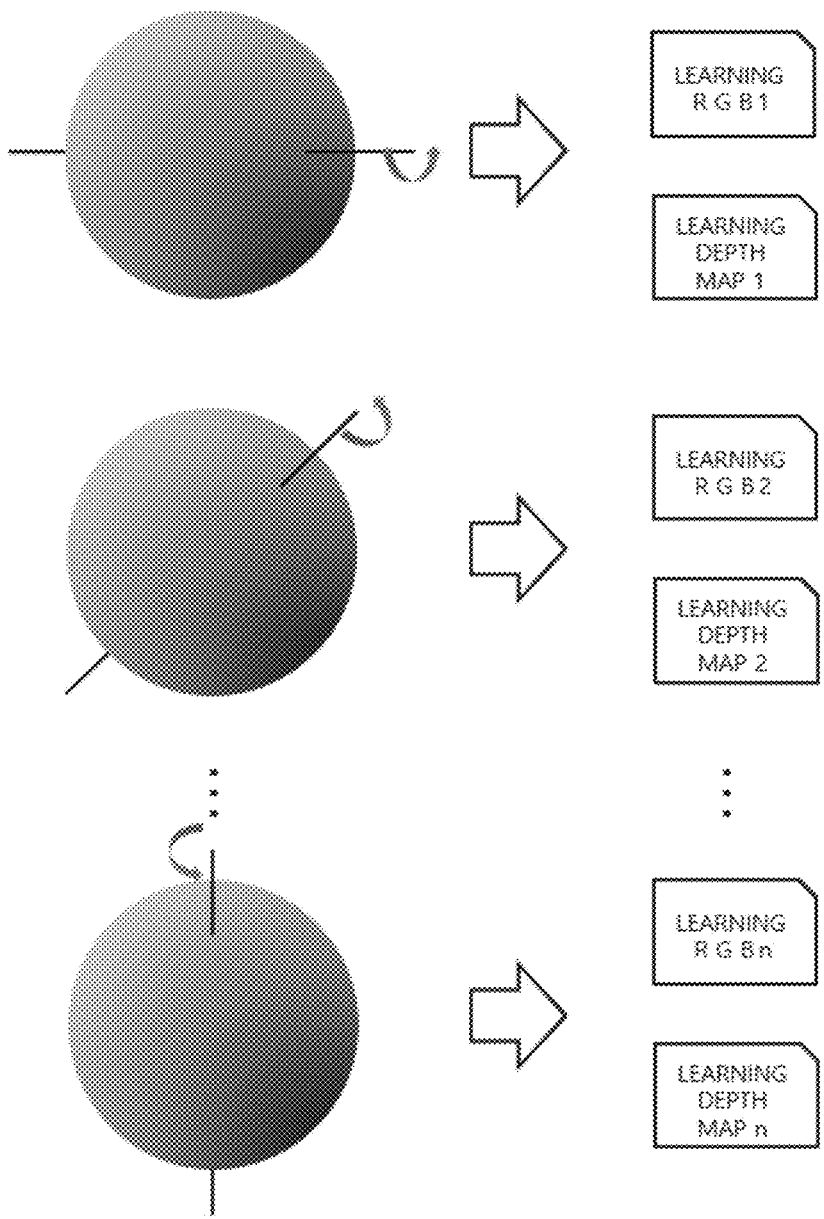

FIG. 5 is a view for describing a learning data generation method according to an embodiment disclosed in the present application, and FIGS. 6A, 6B, and 6C are reference diagrams describing the learning data generation method in FIG. 5. Referring to FIG. 5, the learning data generation module 310 may generate the basic spherical virtual image using the basic RGB image and the basic depth map image (S501).

For example, the learning data generation module 310 may generate the basic spherical virtual image by performing spherical transformation based on the basic RGB image and the basic depth map image.

This is illustrated in operation of FIG. 6A. That is, the basic spherical virtual image may be one basic spherical virtual image obtained from one basic RGB image and the basic depth map image.

In the embodiment of generating the basic spherical virtual image, the learning data generation module 310 may generate the basic spherical virtual image based on the basic RGB image, and generate the basic spherical virtual image by associating the pieces of depth information corresponding to each pixel of the basic spherical virtual image based on the basic depth map image.

For example, the learning data generation module 310 may generate the basic spherical virtual image in which the distance of each pixel is expressed as an equal distance by performing spherical transformation on the basic RGB image. The learning data generation module 310 may store the distance information corresponding to each pixel of the basic RGB image using the basic depth map image by associating the distance information with the basic spherical virtual image. For example, the distance information corresponding to each pixel of the RGB image may be stored as a table including identification information on each pixel and distance information therefor.

In such an embodiment, when a change in the configuration information on the basic spherical virtual image occurs, the learning data generation module 310 may change and store the distance information in response to such a change. For example, when the rotation at a specific angle in a specific direction based on a specific rotation axis for the basic spherical virtual image occurs, the distance information may be acquired from the table by reflecting the change in the position of the pixel changed by the rotation.

In another embodiment of generating a basic spherical virtual image, the learning data generation module 310 may generate spherical virtual images for each of the basic RGB image and the basic depth map image.

For example, the learning data generation module 310 may generate a first basic spherical virtual image in which a distance of each pixel is expressed as an equal distance by performing spherical transformation on the basic RGB image, and generate a second basic spherical virtual image in which each pixel is represented by distance information by performing spherical transformation on the basic depth map image.

In the present embodiment, the learning data generation module 310 may change the configuration information in the same way for a pair of the first basic spherical virtual image and the second basic spherical virtual image, in which a pair of first and second base spherical virtual images in which the configuration information is converted correspond to the learning spherical virtual image, and generate a pair of learning RGB images and learning depth map images by performing plane transformation on the first and second spherical virtual images.

In still another embodiment of generating the basic spherical virtual image, the learning data generation module 310 may generate a three-dimensional basic depth map image by reflecting both color information and distance information in one pixel. That is, in the above-described embodiments, as in the example illustrated in FIG. 6, since the distance of each pixel is set to be constant, the shape of the basic spherical virtual image is displayed as a round sphere, but in the present embodiment, since each pixel is displayed according to the distance information, the shape of the basic spherical virtual image is displayed in a three-dimensional shape in a three-dimensional space, not a round sphere.

For example, the learning data generation module 310 may obtain color information at each pixel from the basic RGB image and obtain distance information at each pixel from the basic depth map image, thereby configuring the color information and distance information for each pixel. The learning data generation module 310 may generate the basic spherical virtual image by expressing the color information and distance information for each set pixel in three-dimensional coordinates. Such a basic spherical virtual image is represented by a three-dimensional shape displayed on a three-dimensional space instead of a circular shape.

The learning data generation module 310 may change the configuration information of the basic spherical virtual image to generate a plurality of learning spherical images (S502). For example, the configuration information may include a rotation axis, a rotation direction, a rotation angle, or the like of the spherical image.

For example, the learning data generation module 310 may generate a plurality of learning spherical images from the basic spherical virtual image after changing at least one of the rotation axis, the rotation direction, or the rotation angle for the basic spherical virtual image.

FIG. 6B shows an example of generating a plurality of learning spherical images after changing the configuration information of the basic spherical virtual image.

The learning data generation module 310 may transform a plurality of learning spherical images back into a plane to generate a plurality of learning data sets (S503), in which the learning data set means a learning RGB image and a pair of learning depth map images that match 1:1 to the learning RGB image. Here, the plane transformation is an inverse transformation of the spherical transformation, and the learning RGB image and learning depth map image set may be generated by performing a plane transformation on one learning spherical image.

In this way, generating a plurality of learning spherical images after changing the basic spherical virtual image configuration information provides an effect of generating a large amount of learning data from one basic spherical image. That is, the accurate computational power of the neural network module 320 is made based on a large amount of learning data, but in reality, it is difficult to secure the large amount of learning data. However, in an embodiment of the present application, it is possible to generate a plurality of learning spherical images by applying various modifications based on the basic spherical virtual image, and also easily secure a large amount of learning data sets by inverse transformation.

The generated multiple learning RGB images and learning depth map images may be provided to the neural network module 320 and used as learning information.

Figure 7:
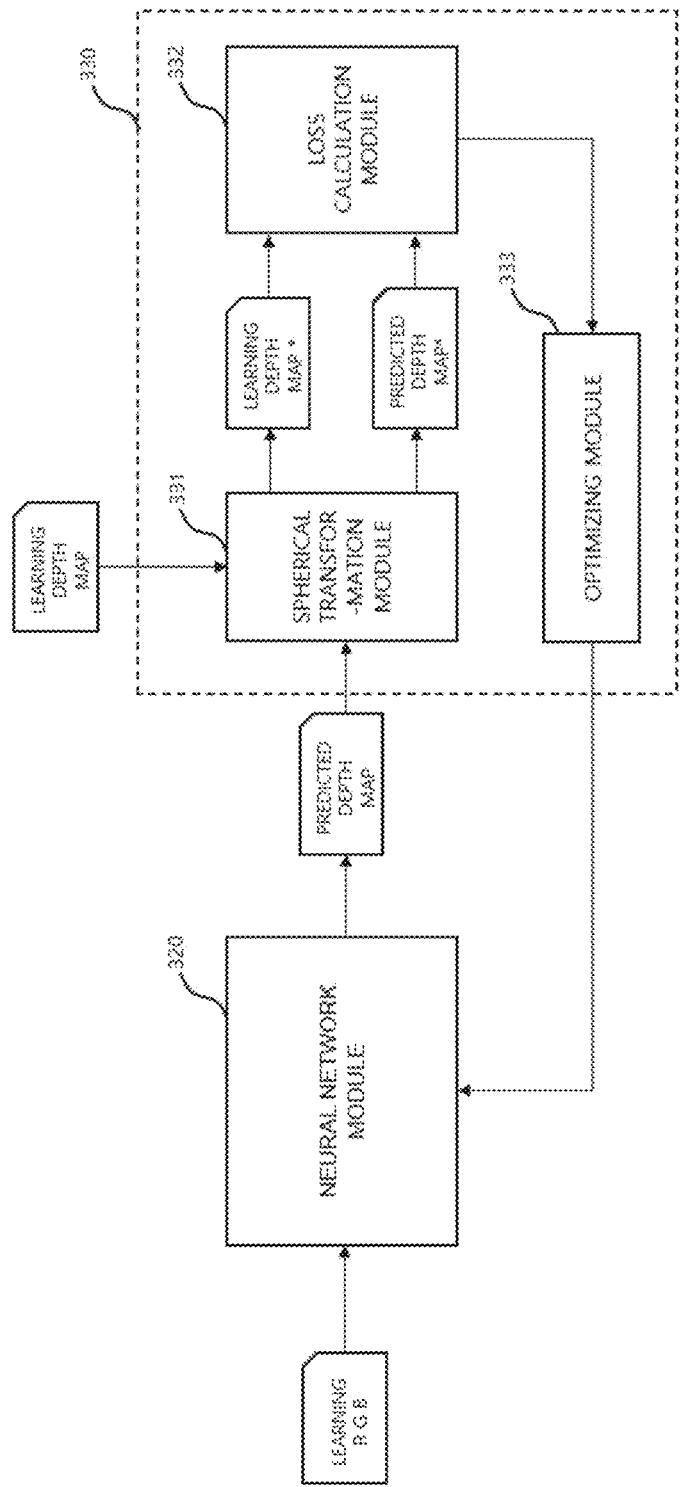
FIG. 7 illustrates an example of a neural network architecture, in accordance with one or more embodiments.
Figure 8:
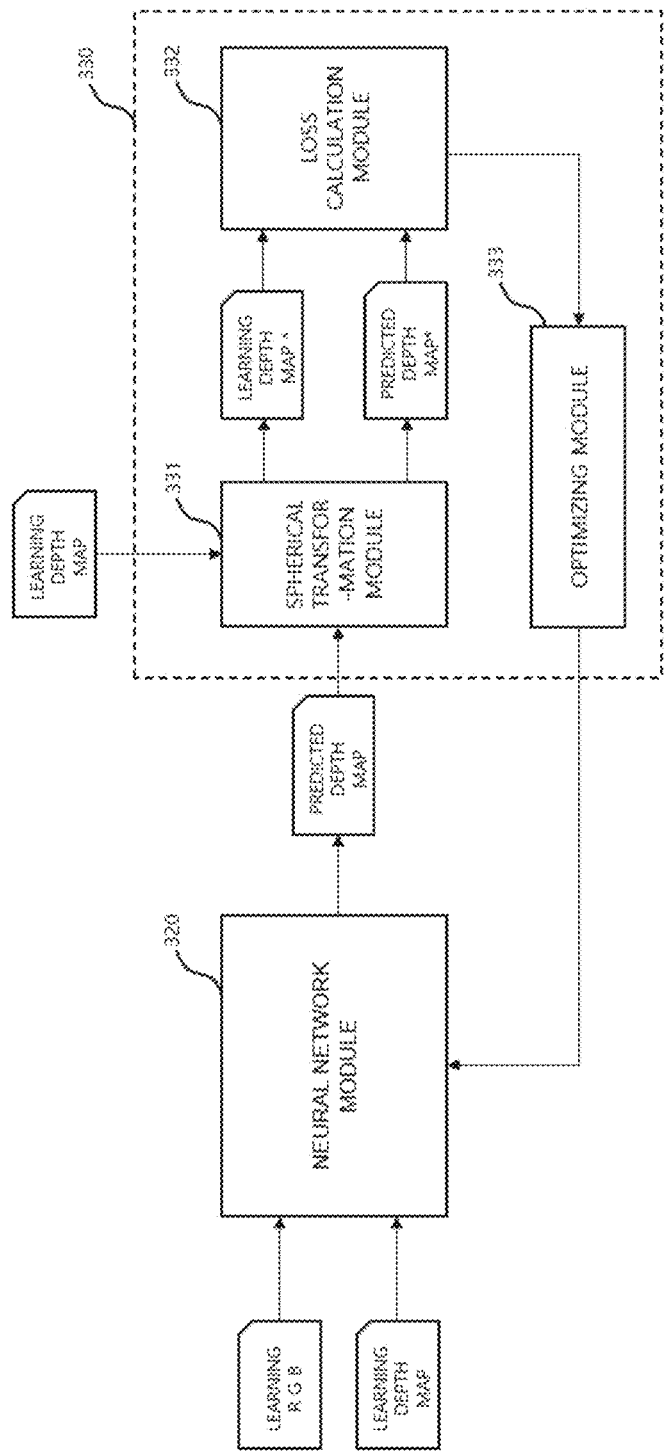
FIG. 8 illustrates another example of a neural network architecture, in accordance with one or more embodiments.

FIG. 7 is a diagram illustrating an example of a neural network architecture according to an embodiment disclosed in the present application, and FIG. 8 is a diagram illustrating another example of a neural network architecture according to an embodiment disclosed in the present application.

For ease of description, the neural network module 320 illustrated in FIGS. 7 and 8 is described as being implemented using the computing device 300 described in FIG. 2. That is, it may be implemented by the execution of at least one instruction performed by the memory 302 and the processor 301 of the computing device 300. However, in addition, the neural network module 320 may be used in any other suitable device(s) and any other suitable system(s). Also, the neural network module 320 is described as being used to perform image processing related tasks. However, the neural network module 320 may be used to perform any other suitable tasks together, including non-image processing tasks.

The neural network module 320 performs learning based on the learning RGB image for learning and the depth map image for the learning RGB image.

The neural network module 320 is a deep learning-based image conversion learning model, and may generate a predicted depth map image based on transformation through a learning neural network for an input learning RGB image.

The neural network module 320 may be expressed as a mathematical model using nodes and edges. The neural network module 320 may be an architecture of a deep neural network (DNN) or n-layers neural networks. DNN or n-layer neural networks may correspond to convolutional neural networks (CNNs), convolutional neural networks (CNNs) based on a deep high-resolution network (HRNet), recurrent neural networks (RNNs), deep belief networks, restricted Boltzman machines, etc.

As an example, the neural network module 320 may receive a learning RGB image as an example shown in FIG. 7 and generate a predicted depth map image for the learning RGB image. In this example, since there is no learned content in an initial operation, the neural network module 320 may generate a predicted depth map image based on random values at each node of the neural network. The neural network module 320 may improve the accuracy of the predicted depth map by repeatedly performing feedback training on the generated predicted depth map image.

As another example, as illustrated in FIG. 8, the neural network module 320 may receive a learning RGB image and a learning depth map set matching the learning RGB image, learn the association between the RGB image and the depth map image based on the learning, and generate the predicted depth map image for the input learning RGB based on such association. Even in this example, it is possible to improve the accuracy of the predicted depth map by repeatedly performing the feedback training on the predicted depth map image.

Figure 9:
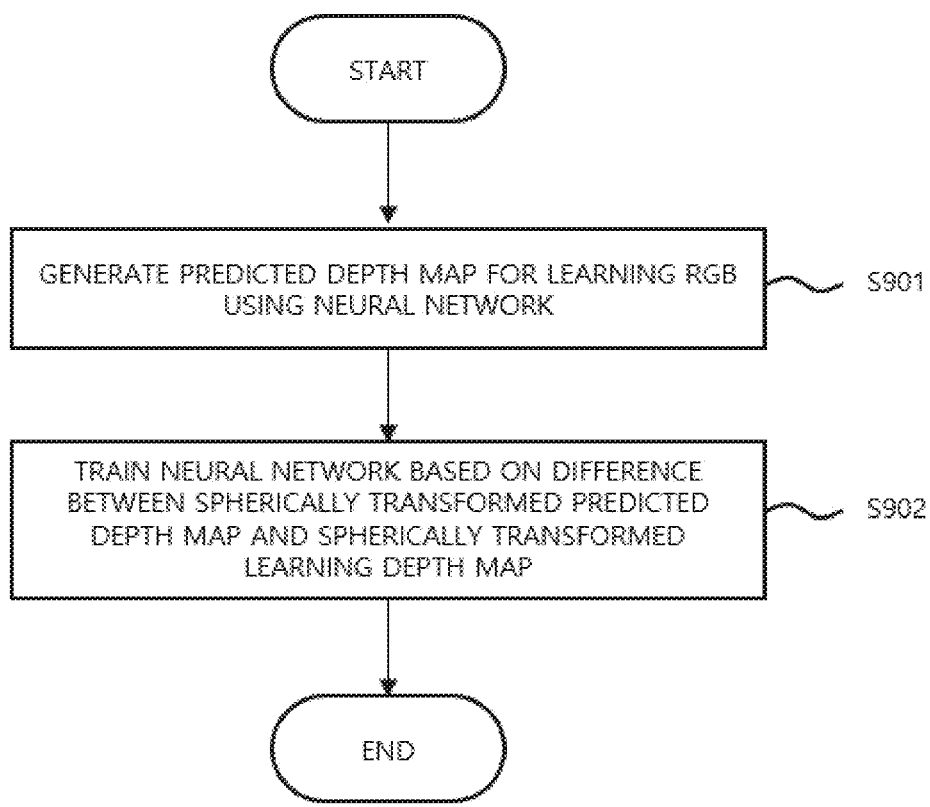
FIG. 9 illustrates a training method implementing a neural network, in accordance with one or more embodiments.

FIG. 9 is a diagram for describing a training method using a neural network according to an embodiment disclosed in the present application, which will be further described below with reference to FIG. 9.

The neural network module 320 receives a learning RGB image and generates a predicted depth map image for the received learning RGB image based on the learned contents (S901).

The learning RGB image refers to an RGB image provided to the neural network module 320 for learning. The learning depth map image refers to a depth map image provided to the neural network module 320 or the training module 330 for learning. The learning depth map image is 1:1 related to the learning RGB image. The learning depth map image is generated by measuring the distance using a LiDAR sensor, etc., for the subject area where the learning RGB image is generated, and therefore, is a ground truth depth.

The neural network module 320 is a deep learning-based image transformation learning model, and may generate a predicted depth map image based on transformation through a learning neural network for an input learning RGB image.

Thereafter, the neural network module 320 performs learning through a training process to be described below (S902). As described above, the neural network module 320 may perform learning on a plurality of learning RGB images and learning depth maps generated by the learning data generation module 310, thereby easily increasing accuracy.

The predicted depth map image is a depth map generated by the learned neural network module 320. This predicted depth map image differs from the learning depth map image, which is a ground truth depth map, generated by measuring the distance using a LiDAR sensor or the like. Therefore, the neural network module 320 may be trained so that the difference between this predicted depth map image and the learning depth map image decreases, and the training of the neural network module 320 is performed by the training module 330.

The training module 330 may compare the predicted depth map generated by the neural network module 320 with the learning depth map, and train the neural network module 320 based on the difference.

In an embodiment, the training module 330 may perform training based on spherical transformation. For example, the training module 330 performs spherical transformation on each of the predicted depth map and the learning depth map and then may train the neural network module 320 based on the difference between the spherically transformed estimated depth map and the spherically transformed learning depth map.

In such an embodiment, the learning RGB image, the predicted depth map image, and the learning depth map image may all be equirectangular projection images. That is, since the equirectangular projection image is used in the spherically transformed state, in order to more accurately determine the difference in the usage state between the predicted depth map image and the learning depth map image, the training module 330 perform spherical transformation on the predicted depth map and the learning depth map, and then comparing the spherically transformed predicted depth map and leaning depth map, thereby performing training. This will be further described with reference to FIG. 10.

Figure 10:
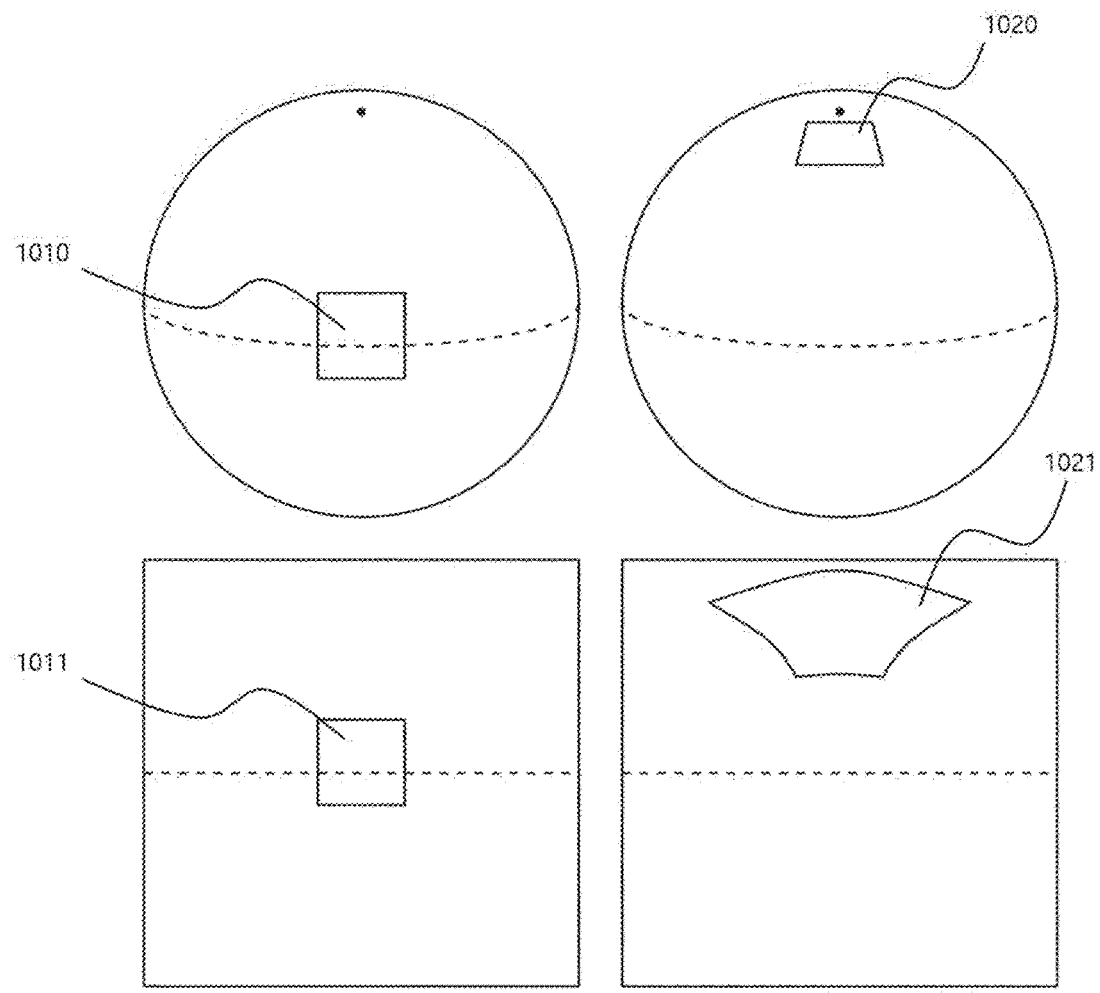
FIG. 10 illustrates a difference between an equirectangular projection image and a spherical virtual image generated using the equirectangular projection image, in accordance with one or more embodiments.

FIG. 10 is a diagram illustrating a difference between an equirectangular projection image and a spherical virtual image generated using the equirectangular projection image according to an embodiment disclosed in the present application.

An area A 1010 and an area B 1020 have the same area and shape in the spherical virtual image, but when the spherical virtual image is converted into an equirectangular projection image, an area A' 1011 and an area B' 1021 have different areas and forms. This is due to the conversion between the spherical virtual image and the planar equirectangular projection image (panoramic image).

Accordingly, the training module 330 performs spherical transformation on each of the predicted depth map and the learning depth map and then performs training, thereby increasing the accuracy of the training and the accuracy of the predicted depth map image accordingly.

Figure 11:
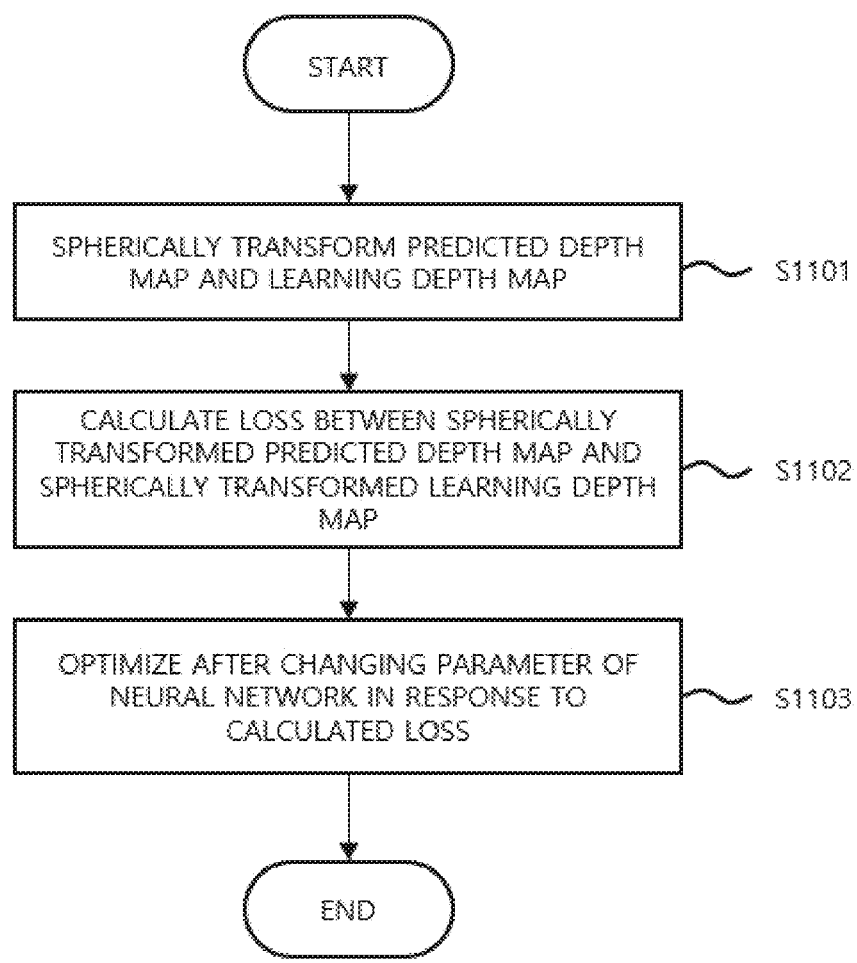
FIG. 11 illustrates a training method by a training module, in accordance with one or more embodiments.

FIG. 11 is a diagram for describing a training method by a training module according to an embodiment disclosed in the present disclosure, which will be described below with reference to FIGS. 8 and 11.

As illustrated in FIG. 8, the training module 330 may include a spherical transformation module 331, a loss calculation module 332, and an optimizing module 333.

Referring further to FIG. 11, the spherical transformation module 331 performs spherical transformation on the equirectangular projection image so that the equirectangular projection image corresponds to the spherical transformation. The spherical transformation module 331 may receive the predicted depth map image and the learning depth map image, and perform spherical transformation on each of the received predicted depth map image and learning depth map image (S1101).

In FIG. 8, the learning depth map image spherically transformed by the spherical transformation module 331 is denoted as a "learning depth map*," and the predicted depth map image that is spherically transformed is denoted as a "predicted depth map*."

In an embodiment, the spherical transformation module 331 may perform spherical transformation using Equation 1 below.

$$[\psi \star f](R) = \langle L_R \psi f \rangle = \int_{S^2} \sum_{k=1}^{K} \psi_k(R^{-1}x) f_k(x) dx. \quad \text{[Equation 1]}$$

A detailed description of Equation 1 may be easily understood with reference to the description illustrated in FIG. 16.

The loss calculation module 332 may calculate a loss between the spherically transformed predicted depth map* and the spherically transformed learning depth map* (S1102).

That is, the loss calculation module 332 may quantify the difference (loss value) between the spherically transformed predicted depth map and the spherically transformed learning depth map. As an example, the loss value determined by the loss calculation module 332 may be determined in a range between 0 and 1.

The optimizing module 333 may receive a loss calculated from the loss calculation module 332 and perform optimization after changing parameters of the neural network in response to the loss (S1103).

As an example, the optimizing module 333 may perform optimization by adjusting a weight parameter W of the neural network. As another example, the optimizing module 333 may perform optimization by adjusting at least one of a weight parameter W and a bias b of the neural network.

Various optimization methods are applicable to the optimizing module 333. For example, the optimizing module 333 may performing optimization using batch gradient descent, stochastic gradient descent, mini-batch gradient descent, momentum, Adagrad, RMSprop, etc.

Figure 12:
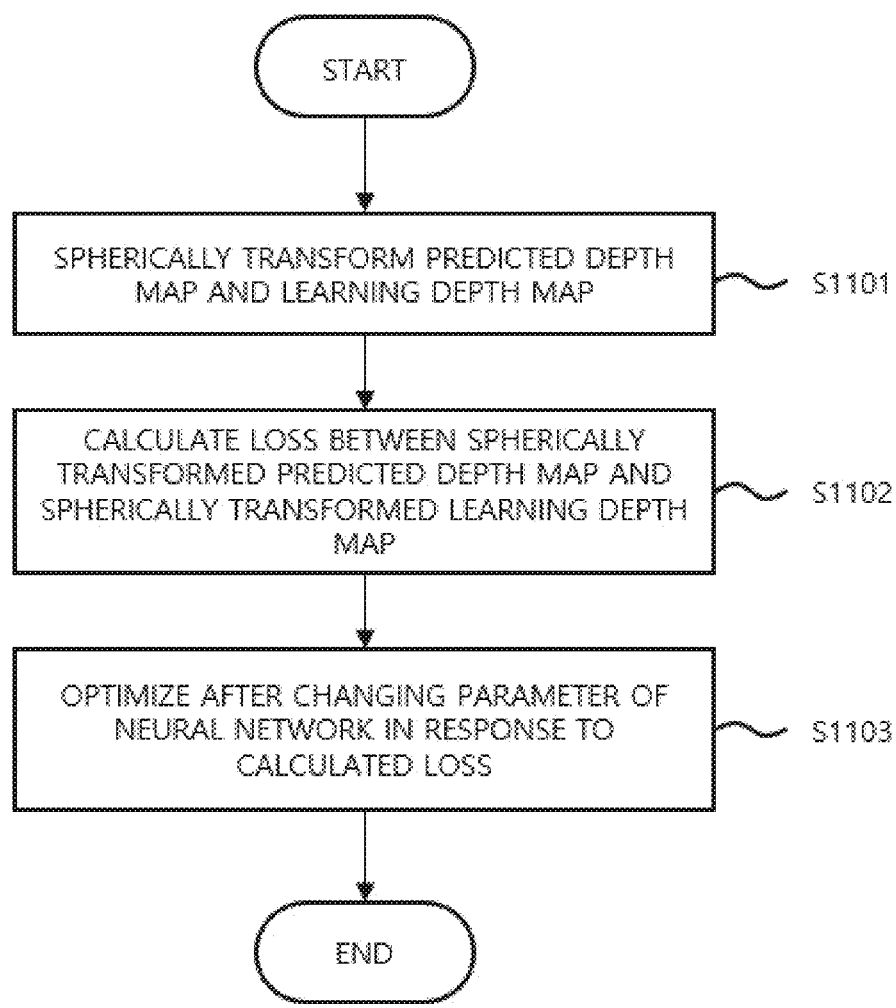
FIG. 12 illustrates a loss calculation method, in accordance with one or more embodiments n.

FIG. 12 is a diagram for describing a loss calculation method according to an embodiment disclosed in the present application.

In the embodiment illustrated in FIG. 12, the loss calculation module 332 may determine a loss by applying a plurality of loss calculation methods and calculating a representative value from the result values.

Referring to FIG. 12, the loss calculation module 332 may calculate a first loss function result between the spherically transformed predicted depth map and the spherically transformed learning depth map using a first loss calculation method (S1201).

Equation 2 below is an Equation for describing an example of the first loss calculation equation.

$$RMSE = \sqrt{\frac{1}{T}\sum_i \|y_i - y_i^*\|^2} \quad \text{[Equation 2]}$$

Here, T denotes the number of samples, y denotes the learning depth map, and y* denotes the predicted depth map.

The loss calculation module 332 may calculate a second loss function result between the spherically transformed predicted depth map and the spherically transformed learning depth map using a second loss calculation method (S1202).

Equation 3 below is an Equation for describing an example of the second loss calculation equation.

$$SILog = \frac{1}{T}\sum_i d_i^2 - \frac{1}{T^2}\left(\sum_i d_i\right)^2 \quad \text{[Equation 3]}$$

Here, T denotes the number of samples, and d denotes the difference between the learning depth map and the predicted depth map in a log space.

The loss calculation module 332 may calculate a third loss function result between the spherically transformed predicted depth map and the spherically transformed learning depth map using a third loss calculation method (S1203).

Equation 4 below is an Equation for describing an example of the third loss calculation equation.

$$L2LossFunction = \sum_{i=1}^{n}(y_{true} - y_{predicted})^2 \quad \text{[Equation 4]}$$

Here, $y_{true}$ denotes the learning depth map and $y_{predicted}$ denotes the predicted depth map.

The loss calculation module 332 may calculate a representative value for the first loss function result to the third loss function result, and determine the calculated representative value as a loss (S1204). Here, a mean, a median, a mode, etc., are applicable as the representative value.

FIGS. 13A, 13B, 13C, and 13D illustrate an example of a learning RGB image, a learning depth map image, a predicted depth map image, and a difference image between the predicted depth map image and the learning depth map image.

Figure 13A:
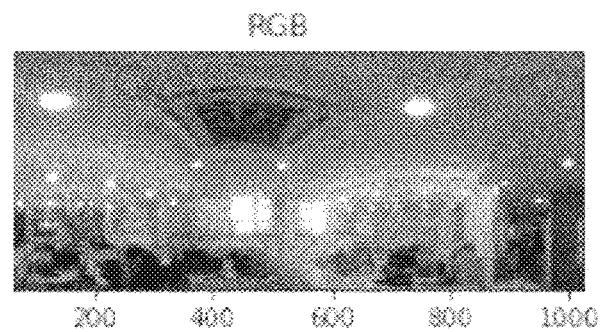
FIG. 13A, FIG. 13B, FIG. 13C, and FIG. 13D illustrate an example of a learning RGB image, a learning depth map, a predicted depth map, and a difference image between the predicted depth map and the learning depth map.

FIG. 13A illustrates an example of a learning RGB image input to the neural network module 320.

Figure 13B:
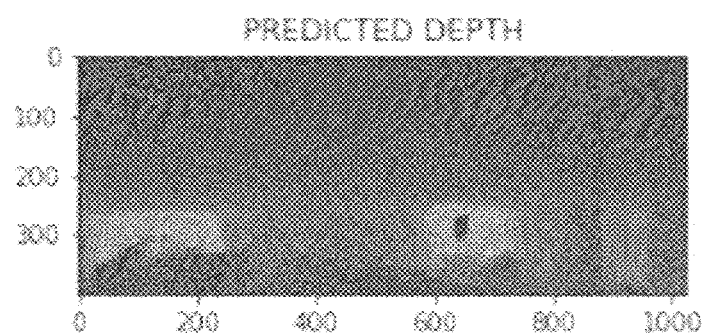
Figure 13C:
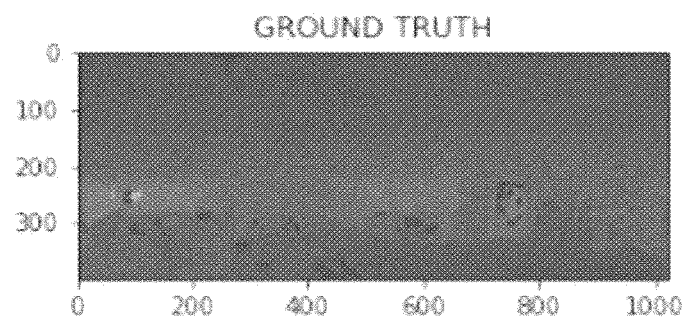

FIG. 13B illustrates an example of the predicted depth map image generated by the neural network module 320 receiving the learning RGB image.

FIG. 13C illustrates an example of a learning depth map image that provides a ground truth depth value corresponding to the learning RGB image.

Figure 13D:
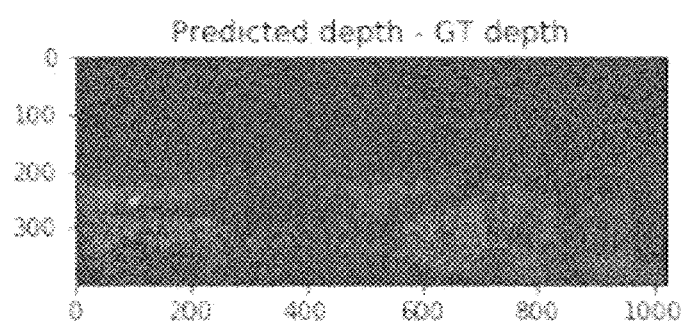

FIG. 13D illustrates a difference image between a predicted depth map image and a learning depth map image. However, FIG. 13D is for an intuitive explanation, and as described above, in an embodiment disclosed in the present disclosure, when the training module 330 performs spherical transformation on the predicted depth map image and the learning depth map image, and then, calculates the difference, the difference image may be displayed differently from FIG. 13D.

Figure 14:
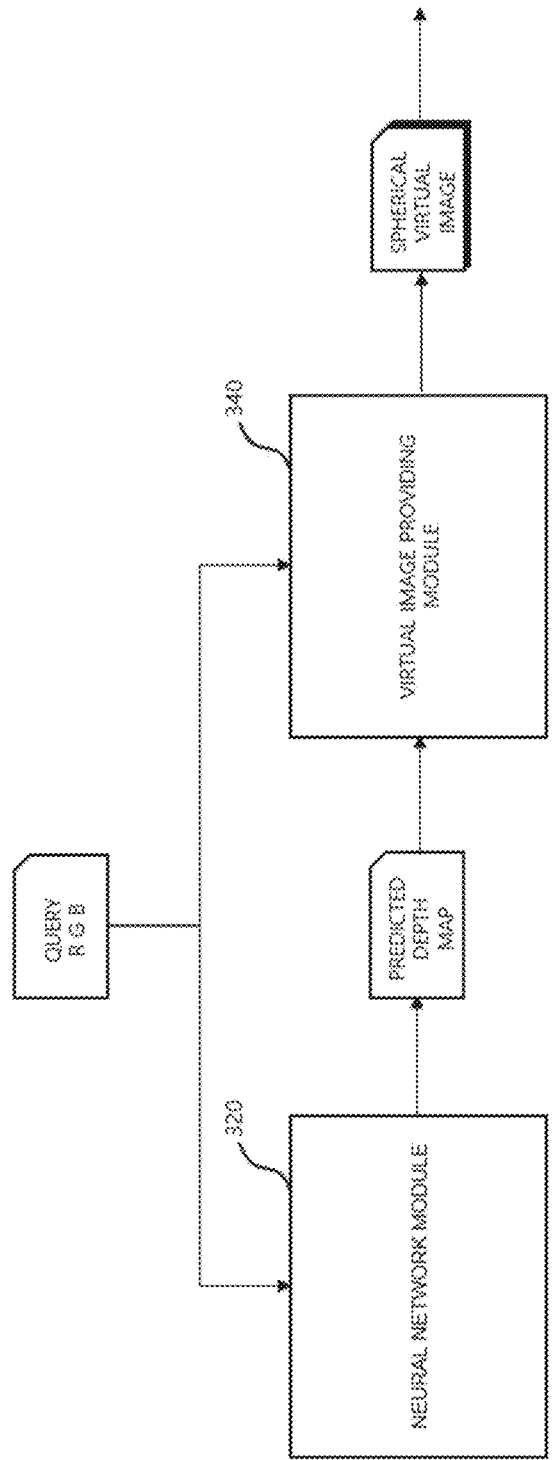
FIG. 14 illustrates a spherical virtual image generation architecture, in accordance with one or more embodiments.
Figure 15:
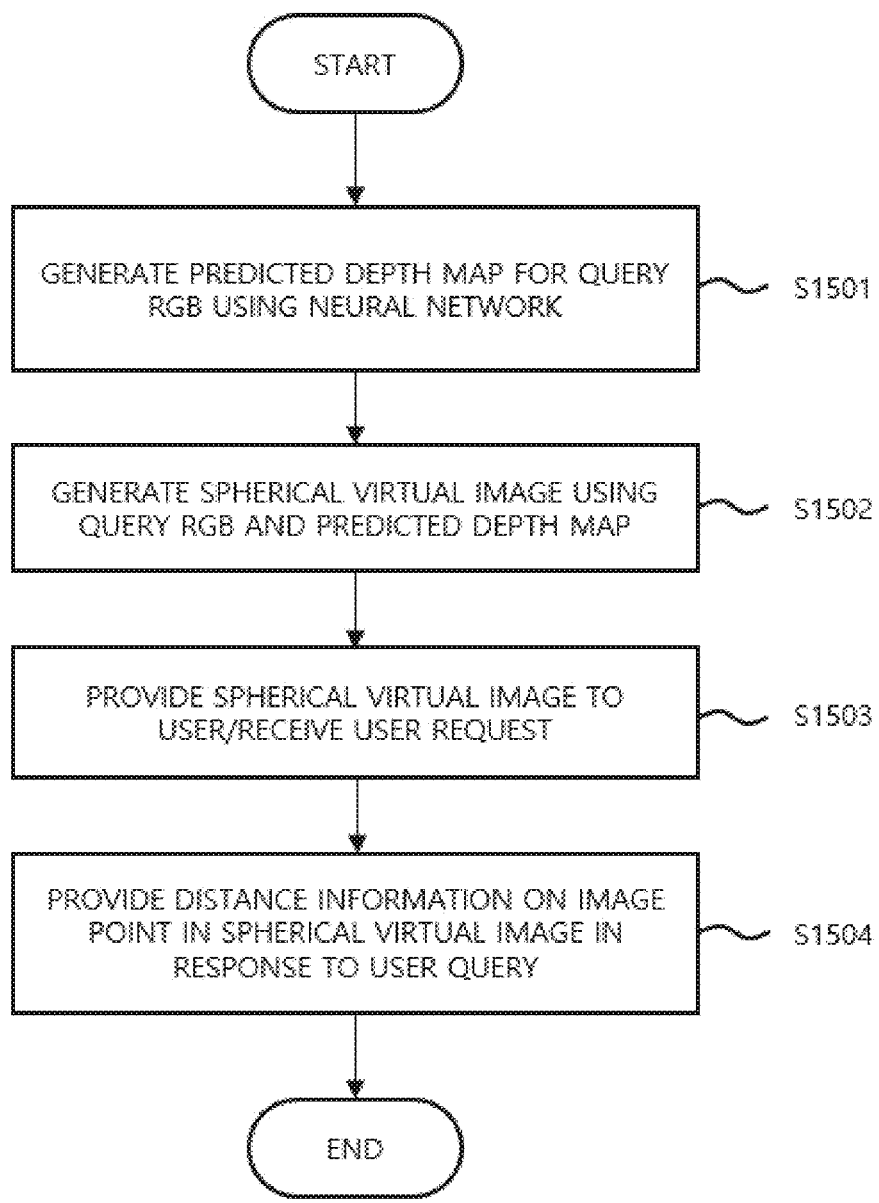
FIG. 15 illustrates a method of providing a spherical virtual image to a user, in accordance with one or more embodiments.

FIG. 14 is a diagram for describing a spherical virtual image generation architecture according to an embodiment disclosed in the present disclosure, and FIG. 15 is a diagram for describing a method of providing a spherical virtual image to a user according to an embodiment disclosed in the present disclosure.

A method of providing a spherical virtual image to a user according to an embodiment disclosed in the present disclosure will be described with reference to FIGS. 14 and 15.

When the neural network module 320 receives a query RGB image, the neural network module 320 generates a predicted depth map corresponding to the query RGB image by using the neural network trained as described above (S1501).

Here, the query RGB image is an RGB image used to generate a spherical virtual image, and is an image without a ground truth depth map matching the RGB image. Accordingly, the predicted depth map is generated using the neural network module 320 and used to generate a spherical virtual image.

The neural network module 320 provides the generated predicted depth map to the virtual image providing module 340.

The virtual image providing module 340 may generate a spherical virtual image based on the query RGB image and the predicted depth map image provided from the neural network module 320 (S1502).

For example, the virtual image providing module 340 may check the predicted depth map generated by the neural network module 320 and generate the spherical virtual image using the query RGB image and the predicted depth map.

Here, the spherical virtual image is an image for providing a virtual space that a user may experience.

As an example, the spherical virtual image may generate the spherical virtual image based on the query RGB image, and may include distance information from each pixel included in the predicted depth map image for each pixel of the spherical virtual image. FIG. 4B illustrates an example of such a spherical virtual image, and FIG. 4B illustrates an example in which a virtual image is displayed in the form of a perfect sphere because each pixel is displayed as being at the same distance. Even when displayed in this way, since the distance information on each pixel is included, the distance information may be obtained for each pixel in the spherical virtual image.

As another example, the spherical virtual image may display the position and color of each pixel on three-dimensional coordinates using color information on each pixel obtained from the query RGB image and distance information on each pixel obtained from the predicted depth map image. Another example of such a spherical virtual image may be displayed as a three-dimensional space displayed on three-dimensional coordinates.

That is, the spherical virtual image may include distance information on at least one point (e.g., a pixel) included in the virtual image. Here, the distance information is determined based on the predicted depth map.

The virtual image providing module 340 may provide a spherical virtual image to a user. For example, the virtual image providing module 340 may provide a user terminal 100 with a user interface including an access function for the spherical virtual image.

The virtual image providing module 340 may receive a user request from the user through the user interface (S1503). For example, the virtual image providing module 340 may receive a request for checking a distance for at least one picture point in the spherical virtual image, that is, a user query. The virtual image providing module 340 may check the distance information on the picture point in the spherical virtual image in response to the user query and provide the checked distance information to the user. For example, in the spherical virtual image provided to the user terminal 100, the user may set a desired object or location in space, and the virtual image providing module 340 may check the distance information on the desired object or location and provide the checked distance information to the user terminal 100.

The one or more examples relate to a method to generate a depth map image and a computing device therefor, and has high industrial applicability by providing distance information for a virtual space, a variety of learning data sets generated using one RGB image and a distance map image for the RGB image, and generating a depth map image from an RGB image based on learning using a neural network model.

While this disclosure includes specific examples, it will be apparent to one of ordinary skill in the art, after an understanding of the disclosure of this application, that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. A computing device comprising:
a memory configured to store one or more instructions; and
a processor configured to execute the one or more instructions stored in the memory,
wherein the processor is configured to execute the one or more instructions to generate a first predicted depth map image for a learning red/green/blue (RGB) image using a neural network, and trains the neural network based on a difference between a learning depth map image having depth information and the first predicted depth map image, and
the learning RGB image and the learning depth map image match 1:1, and are generated based on the same setting change for a basic spherical image,
wherein the processor executes the one or more instructions to:
input a query RGB image to the learned neural network,
confirm a second predicted depth map image generated by the neural network in response to the query RGB image, and
generate a spherical virtual image using the query RGB image and the second predicted depth map image, the spherical virtual image including distance information on at least one point included in a virtual image, and the distance information being determined based on the second predicted depth map image.

2. The computing device of claim 1, wherein each of the learning depth map image and the first predicted depth map image is an equirectangular projection image.

3. The computing device of claim 1, wherein the processor is configured to:
execute the one or more instructions to perform spherical transformation on the learning depth map image and the first predicted depth map image,
determine a loss between the spherically transformed learning depth map image and the spherically transformed first predicted depth map image, and
train the neural network after changing a parameter of the neural network in response to the determined loss.

4. The computing device of claim 3, wherein the processor executes the one or more instructions to calculate a loss function result between the spherically transformed learning depth map image and the spherically transformed first predicted depth map image using a plurality of different loss functions, and
calculate a representative value for a plurality of calculated loss function results and determine the calculated representative value as the loss.

5. The computing device of claim 1, wherein the processor executes the one or more instructions to provide the spherical virtual image to a user through a user terminal, and
extract depth information on the at least one point and provide the extracted depth information to the user terminal when receiving a user request for at least one point of the spherical virtual image from the user.

6. A computing device comprising:
a memory configured to store one or more instructions; and
a processor configured to execute the one or more instructions stored in the memory,
wherein the processor executes the one or more instructions to:
generate a predicted depth map image for a query red/green/blue (RGB) image using a neural network; and
generate a spherical virtual image using the query RGB image and the predicted depth map image, the spherical virtual image including distance information on at least one point included in a virtual image, and the distance information being determined based on the predicted depth map image.

7. The computing device of claim 6, wherein the processor executes the one or more instructions to provide the spherical virtual image to a user through a user terminal, and
extract depth information on the at least one point and provide the extracted depth information to the user terminal, when receiving a user request for at least one point of the spherical virtual image from the user.

8. A depth map image generation method performed in a computing device, the method comprising:
generating a first predicted depth map image for a learning red/green/blue (RGB) image using a neural network; and
training the neural network based on a difference between a learning depth map image and the first predicted depth map image generated based on spherical transformation, the learning depth map image matching the learning RGB image and having depth information,
the method further comprising:
inputting a query RGB image to the learned neural network;
confirming a second predicted depth map image generated by the neural network in response to the query RGB image; and
generating a spherical virtual image using the query RGB image and the second predicted depth map image, the spherical virtual image including distance information on at least one point included in a virtual image, and the distance information being determined based on the second predicted depth map image.

9. The depth map image generation method of claim 8, wherein each of the learning depth map image and the first predicted depth map image is an equirectangular projection image.

10. The depth map image generation method of claim 8, wherein the training of the neural network includes:
performing spherical transformation on the learning depth map image and the first predicted depth map image;
determining a loss between the spherically transformed learning depth map image and the spherically transformed first predicted depth map image; and
training the neural network after changing a parameter of the neural network in response to the determined loss.

11. The depth map image generation method of claim 10, wherein the training of the neural network includes:
calculating a loss function result between the spherically transformed learning depth map image and the spherically transformed first predicted depth map image using a plurality of different loss functions; and
calculating a representative value for a plurality of calculated loss function results and determine the calculated representative value as the loss.

12. The depth map image generation method of claim 8, further comprising:
providing the spherical virtual image to a user through a user terminal; and
extracting depth information on the at least one point and providing the extracted depth information to the user terminal when receiving a user request for at least one point of the spherical virtual image from the user.

13. A storage medium in which computer-readable instructions are stored, wherein, when the instructions are executed by a computing device, the instructions cause the computing device to perform operations of:
  generating a predicted depth map for a learning red/green/blue (RGB) image using a neural network; and
  training the neural network based on a difference between a learning depth map and the predicted depth map generated based on spherical transformation, the learning depth map matching the learning RGB image and having depth information,
  the operation further comprising:
  inputting a query RGB image to the learned neural network;
  confirming a second predicted depth map image generated by the neural network in response to the query RGB image; and
  generating a spherical virtual image using the query RGB image and the second predicted depth map image, the spherical virtual image including distance information on at least one point included in a virtual image, and the distance information being determined based on the second predicted depth map image.

14. A computing device comprising:
  a memory configured to store one or more instructions; and
  a processor configured to execute the one or more instructions stored in the memory,
  wherein the processor executes the one or more instructions:
  to receive a basic RGB image and a basic depth map image corresponding to the basic RGB image,
  to generate a plurality of learning spherical images from a basic spherical virtual image after changing configuration information of the basic spherical virtual image generated by performing spherical transformation based on the basic RGB image and the basic depth map image,
  and to generate a plurality of learning RGB images and a plurality of learning depth map images by performing plane transformation on the plurality of learning spherical images,
  wherein the plurality of learning RGB images and the plurality of learning depth map images each match 1:1.

* * * * *